(12) United States Patent
Gao et al.

(10) Patent No.: US 11,977,687 B2
(45) Date of Patent: May 7, 2024

(54) VIRTUAL KEYBOARD FOR INPUTTING CHINESE CHARACTERS AND CONFIGURING METHOD THEREOF, AND CHINESE CHARACTER INPUT SYSTEM

(71) Applicant: Tsinghua University, Beijing (CN)

(72) Inventors: Xiaorong Gao, Beijing (CN); Bingchuan Liu, Beijing (CN); Xinyi Yan, Beijing (CN); Chen Yang, Beijing (CN); Shuming Xu, Beijing (CN)

(73) Assignee: Tsinghua University, Beijing (CN)

( * ) Notice: Subject to any disclaimer, the term of this patent is extended or adjusted under 35 U.S.C. 154(b) by 900 days.

(21) Appl. No.: 16/969,504

(22) PCT Filed: Feb. 12, 2019

(86) PCT No.: PCT/CN2019/074878
§ 371 (c)(1),
(2) Date: Aug. 12, 2020

(87) PCT Pub. No.: WO2019/158055
PCT Pub. Date: Aug. 22, 2019

(65) Prior Publication Data
US 2023/0195238 A1 Jun. 22, 2023

(30) Foreign Application Priority Data
Feb. 13, 2018 (CN) .......................... 201810148667.4

(51) Int. Cl.
*G06F 3/01* (2006.01)
(52) U.S. Cl.
CPC .............. *G06F 3/018* (2013.01); *G06F 3/013* (2013.01); *G06F 3/015* (2013.01)
(58) Field of Classification Search
USPC .................................................. 715/773, 825
See application file for complete search history.

(56) References Cited

U.S. PATENT DOCUMENTS

| 7,199,786 B2 | 4/2007 | Suraqui |
| 2009/0189864 A1* | 7/2009 | Walker ................. G06F 3/0238 |
| | | 345/169 |

(Continued)

FOREIGN PATENT DOCUMENTS

| CN | 1369071 A | 9/2002 |
| CN | 101290546 A | 10/2008 |

(Continued)

OTHER PUBLICATIONS

Yang et al., "Modifying Keyboard Layout to Reduce Finger-travel Distance", Jan. 16, 2017, IEEE Xplore, <URL: https://ieeexplore.ieee.org/stamp/stamp.jsp?tp=&arnumber=7814594>, retrieved Jan. 9, 2024 (Year: 2017).*

(Continued)

*Primary Examiner* — Christopher J Fibbi
(74) *Attorney, Agent, or Firm* — Wolf, Greenfield & Sacks, P.C.

(57) ABSTRACT

The present invention provides a virtual keyboard for inputting Chinese characters and a configuring method thereof, an input method, and a Chinese character input system. The configuring method includes the following steps: setting a geometric layout of the virtual keyboard; and setting initials and finals on available keys of the virtual keyboard respectively using a cost function-based search algorithm so as to obtain an optimal layout of initial keys and final keys, wherein the initial keys and the final keys in the optimal layout are set based on a minimum cost function value for spelling all Chinese syllables, and the minimum cost function value is a minimum sum of weighted distances of the initial keys and the final keys for all the Chinese syllables. When the Chinese characters are input by the virtual keyboard obtained by this method, the number of operation times and the movement distance can be reduced effectively (Continued)

and thus the input efficiency of the Chinese characters and the usability of the virtual keyboard are greatly improved.

20 Claims, 10 Drawing Sheets

(56) References Cited

U.S. PATENT DOCUMENTS

| | | |
|---|---|---|
| 2009/0237361 A1 | 9/2009 | Mosby et al. |
| 2013/0335331 A1* | 12/2013 | Osman .................... G06F 3/018 |
| | | 345/171 |
| 2014/0058725 A1* | 2/2014 | Longe ................. G06F 3/04886 |
| | | 704/9 |
| 2014/0317547 A1* | 10/2014 | Bi ......................... G06F 3/0481 |
| | | 715/773 |
| 2015/0040055 A1* | 2/2015 | Zhao .................... G06F 40/274 |
| | | 715/773 |
| 2015/0199426 A1* | 7/2015 | Lim ...................... G06F 16/338 |
| | | 707/723 |
| 2017/0206004 A1* | 7/2017 | De Bruyn ............... G06F 3/018 |
| 2018/0260111 A1* | 9/2018 | Wu ..................... G06F 3/04886 |
| 2019/0317611 A1* | 10/2019 | Yu ......................... G06F 3/0237 |

FOREIGN PATENT DOCUMENTS

| | | |
|---|---|---|
| CN | 101859188 A | 10/2010 |
| CN | 102368177 A | 3/2012 |
| CN | 103502915 A | 1/2014 |
| CN | 105009037 A | 10/2015 |
| CN | 108268143 A | 7/2018 |

OTHER PUBLICATIONS

International Search Report in connection with International Application No. PCT/CN2019/074878, dated May 15, 2019.

* cited by examiner though the keyboard to improve the input efficiency of the Chinese characters.

VIRTUAL KEYBOARD FOR INPUTTING CHINESE CHARACTERS AND CONFIGURING METHOD THEREOF, AND CHINESE CHARACTER INPUT SYSTEM

CROSS-REFERENCE TO RELATED APPLICATIONS

This application is a 35 U.S.C. § 371 National Phase filing of International Application No. PCT/CN2019/074878, filed on Feb. 12, 2019, entitled "VIRTUAL KEYBOARD FOR INPUTTING CHINESE CHARACTERS, CONFIGURATION METHOD AND INPUT THEREFOR, AND CHINESE CHARACTER INPUT SYSTEM," which claims priority to and the benefit of Chinese Patent Application No. 201810148667.4, filed on Feb. 13, 2018. The entire contents of these applications are incorporated herein by reference in their entirety.

TECHNICAL FIELD

The present invention relates to the technical field of virtual keyboards of computers, and more particularly, to a virtual keyboard for inputting Chinese characters and a configuring method thereof, an input method, and a Chinese character input system including the virtual keyboard.

BACKGROUND

The human brain controls muscles through external neural pathways to achieve interaction with the external environment. However, many diseases may disrupt the neural pathways, thus patients may be unable to control the voluntary movement of the muscles. As a result, patients with severe motor dysfunction must rely on devices for communication with the outside world.

A brain-computer interface is a technology for direct information communication between the brain and external devices independent of human neuromuscular pathways. A brain-controlled spelling system for inputting English letters and punctuations controlled by the brain has been developed currently to help and enable patients with severe motor dysfunction to communicate with the outside world. However, as the Chinese character is a combination of the sound and the shape, if an English virtual keyboard is used to input Chinese characters, it is necessary to input multiple Chinese phonetic letters to spell the Chinese characters, and a movement distance among the operated keys is large. In addition, this input method is time-consuming and has a low input speed, and thus the patients easily feel fatigued.

Therefore, it needs to provide a virtual keyboard for inputting Chinese characters and a configuring method thereof, an input method for inputting Chinese characters, and a Chinese character input system including the virtual keyboard to improve the input efficiency of the Chinese characters.

SUMMARY

In view of the above problems, embodiments of the present invention provide a virtual keyboard for inputting Chinese characters and a configuring method thereof, an input method, and a Chinese character input system including the virtual keyboard, which can at least partially solve the above problems.

According to one aspect of the present invention, a configuring method of a virtual keyboard for inputting Chinese characters is provided. The configuring method includes the following steps:

S100, setting a geometric layout of the virtual keyboard; and

S300, setting initials and finals on available keys of the virtual keyboard respectively by using a cost function-based search algorithm so as to obtain an optimal layout of initial keys and final keys, wherein the initial keys and the final keys in the optimal layout are set based on a minimum cost function value for spelling all Chinese syllables, and the minimum cost function value is a minimum sum of weighted distances of the initial keys and the final keys for all the Chinese syllables.

Exemplarily, the step S300 includes the following steps:

S310, acquiring appearance frequencies of all the Chinese syllables;

S320, setting initials and finals of various Chinese syllables on keys of the virtual keyboard respectively according to a descending order of the appearance frequencies of the Chinese syllables so as to obtain the initial keys and the final keys, wherein if keys for both an initial and a final of a Chinese syllable are not determined, one of the initial and the final is randomly set on one key, and wherein when an initial or a final of each Chinese syllable is set, the initial or the final is set on a key with the smallest distance to the key for the other one of the final and the initial, whose key has been determined, of the Chinese syllable;

S330, summing weighted distances of the initial keys and the final keys for all the Chinese syllables to obtain a cost function value, wherein the weighted distance is determined according to a distance between the initial key and the final key for the Chinese syllable and the appearance frequency of the Chinese syllable;

S340, repeating the step S320 and the step S330 until the number of repetition times reaches a preset threshold; and S350, based on the obtained cost function values, selecting a layout of the initial keys and the final keys, which corresponds to the minimum cost function value, as the optimal layout.

Exemplarily, in the step S320, when the initial or the final of each Chinese syllable is set, if there are a plurality of keys with the smallest distance to the key for the other one of the final and the initial, whose key has been determined, of the Chinese syllable, one key is randomly selected from the plurality of keys for setting the initial or the final of the Chinese syllable.

Exemplarily, in the step S320, setting the initials and the finals of the various Chinese syllables on the keys of the virtual keyboard includes:

setting different initials on different keys and setting different finals on different keys, so that the number of an initial and a final corresponding to any one of the keys does not exceed two.

Exemplarily, the configuring method further includes:

setting a prompt character for a key, wherein the prompt character is a Chinese character corresponding to a Chinese syllable composed of the initial and the final on the key.

Exemplarily, in the step S330, the cost function value is calculated according to the following steps:

S331, calculating a Euclidean distance from a center of an initial key to a center of a final key for each Chinese syllable;

S332, multiplying the Euclidean distance by an appearance frequency of a Chinese syllable to obtain a weighted distance from the center of the initial key to the center of the final key for each Chinese syllable; and S333, summing the weighted distances of all the Chinese syllables so as to obtain the cost function value.

Exemplarily, the step S310 specifically induces:

S311, obtaining each Chinese character and its appearance frequency according to a corpus Chinese character frequency list;

S312, obtaining Chinese syllables corresponding to each Chinese character respectively by using a Chinese Character-to-Pinyin mapping; and S313, for each Chinese syllable, obtaining an appearance frequency of the Chinese syllable according to an appearance frequency(ies) of one or more Chinese characters corresponding to the Chinese syllable.

Exemplarily, the configuring method further includes:

S200, creating a geometric coordinate system, and determining position coordinates of each key of the virtual keyboard according to the geometric coordinate system for calculating the cost function.

Exemplarily, the step S100 includes:

setting the virtual keyboard to be regularly hexagonal or circular and uniformly disposing the keys on the virtual keyboard.

Exemplarily, the configuring method further includes one or more of the following steps before the step S300:

setting a start/pause key at a position in the center of the virtual keyboard;

setting a delete key at a position closely adjacent to the center of the virtual keyboard and on the lower right of the center;

setting a symbol key, a switch key and/or an option key at a position(s) spaced apart from the center of the virtual keyboard and on the lower right of the center; and setting numerical keys at positions farthest from the center of the virtual keyboard and at a lower portion of the virtual keyboard.

Exemplarily, the switch key is configured to switch to a mode that only a final is input for spelling a Chinese character.

Exemplarily, the virtual keyboard includes a first secondary keyboard, a second secondary keyboard and/or a third secondary keyboard; the symbol key is configured to activate the first secondary keyboard; the option key is configured to activate the second secondary keyboard; and the third secondary keyboard is activated after input of each Chinese syllable;

the configuring method accordingly further includes:

setting Chinese symbol keys, a start/pause key at the center, and a delete key and a return key which are located on the lower right of the start/pause key, on the first secondary keyboard;

setting keys responding to user's daily needs on the second secondary keyboard; or/and a Chinese character(s) corresponding to the Chinese syllable, a start/pause key at the center, and a page-turning key located at the lower right corner, on the third secondary keyboard.

Exemplarily, the configuring method further includes:

setting a start/pause key at a position on the virtual keyboard, wherein the start/pause key is configured to control a start and an end of Chinese character input respectively by spreading the virtual keyboard and hiding the spread virtual keyboard to such a state that only the start/pause key is displayed.

According to another aspect of the present invention, a virtual keyboard for inputting Chinese characters that is configured by any above configuring method is provided.

Exemplarily, the virtual keyboard includes seven rows of keys, which include 4 keys, 5 keys, 6 keys, 7 keys, 6 keys, 5 keys, and 4 keys from top to bottom, respectively.

Exemplarily, the keys are "k ui", "h ua", "z ai", "t a", "s eng", "l ao", "d e", "g uo", "r uan", "n iu", "zh ong", "sh i", "y ou", "ch an", "f en", "5 ang", "q ia", "j ian", "start/pause", "b u", "w ei", "6 o", "4 ie", "x iang", "m ing", "delete", "symbol", "7 er", "3 iao", "p in", "c un", "switch", "8 uang", "2 ue", "1 ü", "0 uai", and "9 iong" in sequence from top to bottom and from left to right.

According to a further aspect of the present invention, a Chinese character input system is also provided. The Chinese character input system includes any above virtual keyboard.

Exemplarily, the Chinese character input system acquires an input signal based on a brain-computer interface device or an eye-tracking device.

Exemplarily, according to a still further aspect of the present invention, a method for inputting Chinese characters on a computing device is provided, wherein the Chinese characters are input by employing the virtual keyboard for inputting the Chinese character which is configured by any above configuring method.

In embodiments of the present invention, the Chinese syllables are input through a double spelling input method and a target Chinese character is found by the Chinese syllable. Thus, the number of input times is reduced. In addition, the cost function-based search algorithm is used, and after considering as many layouts of the initials and the finals of the 416 Chinese syllables on the virtual keyboard as possible, the layout of the initial keys and the final keys, which corresponds to the minimum cost function value, is selected as the optimal layout, so that the virtual keyboard for inputting the Chinese characters is obtained. By adopting the virtual keyboard configured according to embodiments of the present invention, when the Chinese characters are input, the movement distance is the shortest and the number of operation times is fewer and thus the input efficiency of the Chinese characters and the usability of the virtual keyboard are greatly improved.

The above description merely summarizes the technical solutions of the present invention. For understanding the technical means of the present invention more clearly, the present invention may be implemented according to the contents in the description, and in order to make the above and other objects, features and advantages of the present invention more apparent and understandable, specific embodiments of the present invention are illustrated below.

BRIEF DESCRIPTION OF THE DRAWINGS

The above and other objects, features and advantages of the present invention will become more apparent by describing embodiments in more detail in conjunction with the accompanying drawings. The accompanying drawings are provided for further understanding of the present invention and constitute a part of the description, together with the embodiments thereof, serve to explain the present invention.

DETAILED DESCRIPTION

Figure 1:
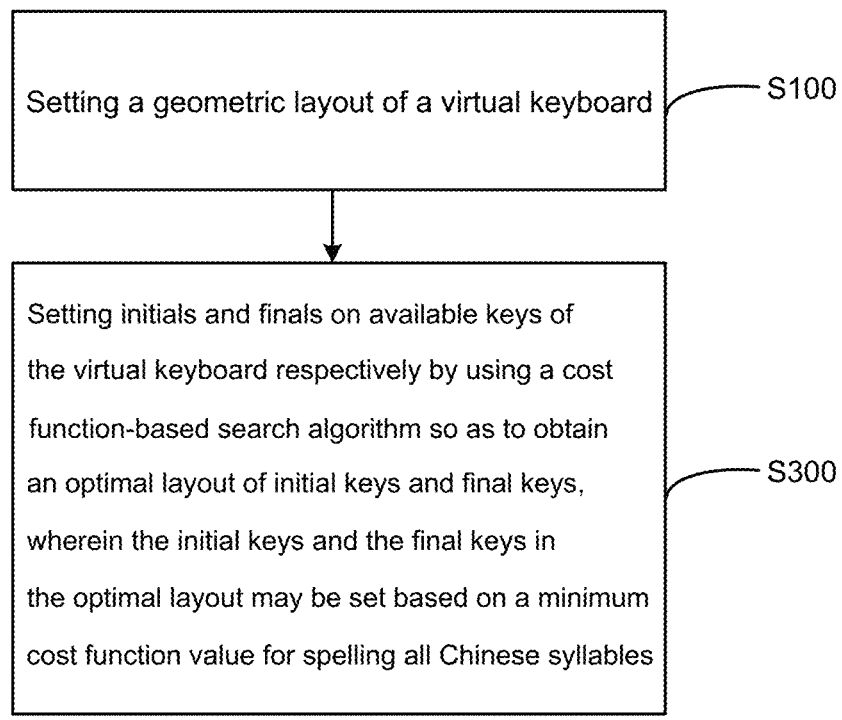
FIG. 1 is a flow chart of a configuring method of a virtual keyboard for inputting Chinese characters according to one embodiment of the present invention.

In order to make the objects, technical solutions, and advantages of the present invention more apparent, exemplary embodiments according to the present invention will be described below in detail with reference to the accompanying drawings. It is apparent that, the embodiments described are merely some but not all embodiments of the present invention. It should be understood that the present invention is not limited by the embodiments described here. Based on the embodiments described in the present invention, all other embodiments derived by a person skilled in the art without creative efforts shall fall within the scope of protection of the present invention.

To satisfy communication needs of patients with limb dysfunction, a Chinese character input system based on a brain-computer interface device and a Chinese character input system based on an eye-tracking device exist at present. The Chinese character input system includes a virtual keyboard displayed on a display interface. Patient with limb dysfunction may communicate with the outside world by the Chinese character input system. The Chinese character input system obtains a control intention signal of the patient with limb dysfunction by the brain-computer interface device or the eye-tracking device. The brain-computer interface device may adopt two paradigms, i.e., steady-state visual evoked potential paradigm and motor imagery paradigm. In the brain-computer interface device based on the steady-state visual evoked potential, the control intention signal is a frequency modulation signal of the virtual keyboard. In the brain-computer interface device based on motor imagery paradigm, the control intention signal is an event-related desynchronization signal. In the eye-tracking device, the control intention signal is the stay of a sight line on a key for a sufficient time.

When the Chinese character input system based on the brain-computer interface device and the Chinese character input system based on the eye-tracking device are compared with an input system input by two hands, the input mode is changed from parallel input by 10 fingers of two hands to a serial input by a single object, and thus the character input efficiency is reduced. Therefore, considering two aspects of Chinese language characteristics and a movement distance, embodiments of the present invention propose a configuring method of a virtual keyboard for inputting Chinese characters (hereinafter referred to as a configuring method). The virtual keyboard obtained according to the configuring method can achieve the shortest movement distance and a fewer number of operation times during inputting of Chinese characters, has a higher information transfer rate for inputting Chinese characters, improves the human-computer interaction efficiency and usability, and thus is convenient to be used by the patients with limb dysfunction.

The virtual keyboard is suitable for the Chinese character input systems based on the brain-computer interface device and the Chinese character input system based on the eye-tracking device. Of course, the virtual keyboard may also be applied to other Chinese character input systems. This virtual keyboard may be used as long as Chinese characters are required to be input.

With reference to FIG. 1 which shows a flow chart of a configuring method according to one embodiment of the present invention, the configuring method includes the following steps.

In S100, a geometric layout is set for the virtual keyboard. The geometric layout of the virtual keyboard includes an overall geometric layout of the virtual keyboard and a geometric layout of various keys on the virtual keyboard. The overall geometrical layout includes an overall shape of the virtual keyboard. The geometric layout of the various keys includes shapes of the various keys and an arrangement mode of all the keys on the virtual keyboard.

Figure 2:
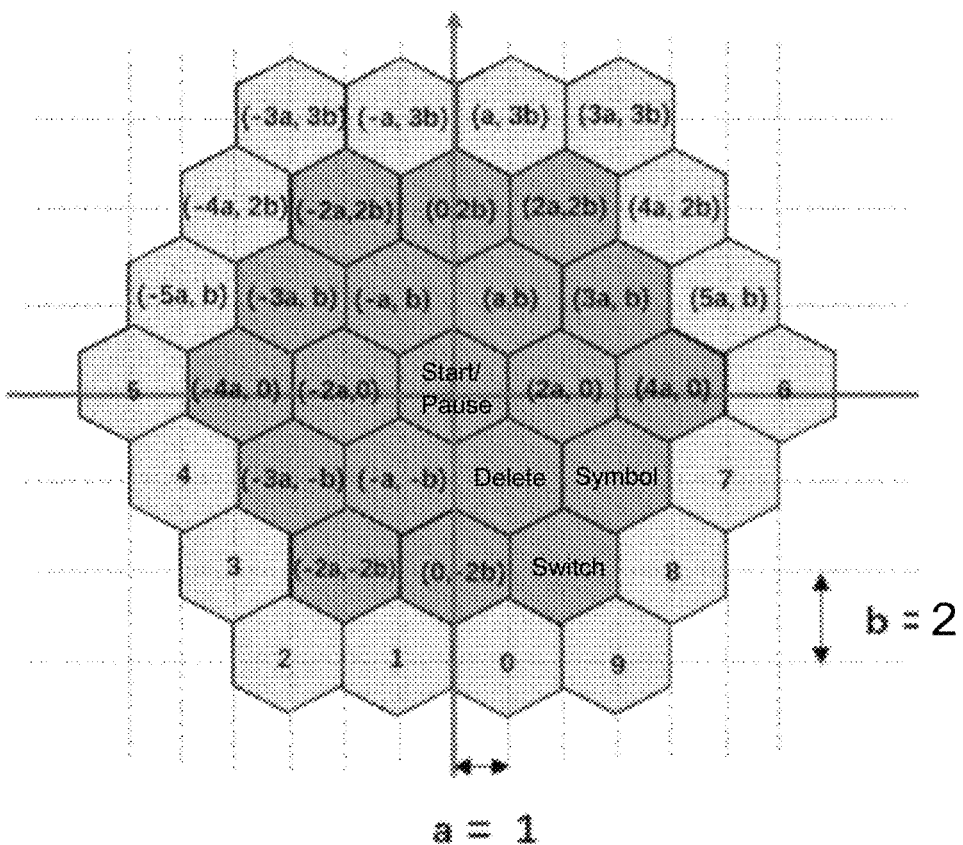
FIG. 2 is a diagram of a geometric layout of a virtual keyboard for inputting Chinese characters according to one embodiment of the present invention.

In one embodiment, the virtual keyboard may be set to be regularly hexagonal, as shown in FIG. 2. The keys may be uniformly distributed on the regularly hexagonal virtual keyboard. Each key may take the shape of a regular hexagon. As such, the virtual keyboard formed by splicing all the keys is regularly hexagonal, so that the keys are spliced to one another compactly. Optionally, each key may be quadrilateral, circular or the like. In another embodiment not shown, the virtual keyboard may be set to be circular. The keys may be uniformly distributed on the circular virtual keyboard. Each key may be circular or takes other shape such as a regular polygon approximating the shape of a circle. Besides, the virtual keyboard may be square, regularly octagonal, regularly decagonal, regularly dodecagonal, or the like.

By setting the overall shape of the virtual keyboard to be regularly hexagonal or circular, it can be ensured that an overall movement distance required during the input of Chinese characters is relatively shorter. The excellent internal splicing of the virtual keyboard can be ensured by disposing the keys on the virtual keyboard uniformly and compactly.

In S300, initials and finals are set on available keys of the virtual keyboard respectively by using a cost function-based search algorithm so as to obtain an optimal layout of initial keys and final keys. The initial keys and the final keys in the optimal layout may be set based on a minimum cost function value for spelling all Chinese syllables. The minimum cost function value is a minimum sum of weighted distances of the initial keys and the final keys for all the Chinese syllables.

The search algorithm is a method that uses high performance of a computer to purposefully and exhaustively enumerate part or all of possible situations of a problem solution space, thereby getting an optimal solution of the problem.

The embodiments of the present invention desire to configure a virtual keyboard for inputting Chinese characters based on Chinese syllables. The pronunciation of each Chinese character is determined by Chinese syllable thereof. Each of most of Chinese syllables corresponds to a plurality of Chinese characters. In the Chinese Pinyin, there are 23 initials and 33 finals. The Chinese syllables are substantially divided into two categories, one is composed of an initial and a final, and the other is composed of a final only. After the initial keys and the final keys are set, a complete Chinese syllable may be obtained by input at most twice. A target Chinese character may be found by a Chinese syllable.

In addition to setting the initials and the finals of the Chinese Pinyin on the virtual keyboard, it also needs to set, on the virtual keyboard, function keys required for inputting the Chinese characters, such as a start/pause key, a delete key, a symbol key, a switch key and/or an option key. Therefore, except the above function keys, keys on the virtual keyboard are available keys for setting of the initials and the finals. 23 available keys are for the initials and 33 available keys are for the finals. An initial and a final may be located on the same key.

The initials and the finals are set on the available keys of the virtual keyboard respectively using the cost function-based search algorithm so as to obtain possible layouts of the initial keys and the final keys. There are 416 Chinese syllables in Chinese, which are "de", "shi", "yi", "zhi", "ji", "you", "bu", "zhe" and the like sequentially according to a descending order of appearance frequencies. The possible layouts of the initials and the finals of the 416 Chinese syllables on the virtual keyboard may be obtained by using the cost function-based search algorithm. The cost function value represents a movement distance of a sight line or a cursor when the Chinese characters are input by the virtual keyboard. In order to achieve the shortest movement distance when the Chinese characters are input, a layout of the initial keys and the final keys, which is set based on the minimum cost function value for spelling all the Chinese syllables, is regarded as the optimal layout. The minimum cost function value is the minimum sum of weighted distances of the initial keys and the final keys for all the Chinese syllables.

In embodiments of the present invention, the Chinese syllables are spelled by a double Pinyin input method and the target Chinese character is found by the Chinese syllable. The double Pinyin input method refers to such a method that a Chinese character may be found as long as an initial and a final (corresponding to the Chinese syllable composed of the initial and the final) are input or only a final (corresponding to the Chinese syllable composed of the final only) is input. Thus, the number of operation times is reduced. In addition, the cost function-based search algorithm is used, and after considering as many layouts of the initials and the finals of the 416 Chinese syllables on the virtual keyboard as possible, the layout of the initial keys and the final keys, which corresponds to the minimum cost function value, is regarded as the optimal layout, so that the virtual keyboard for inputting the Chinese characters is obtained. By adopting the virtual keyboard configured according to embodiments of the present invention, when the Chinese characters are input, the movement distance is the shortest and the number of operation times is fewer and thus the input efficiency of the Chinese characters and the usability of the virtual keyboard are greatly improved.

Figure 3:
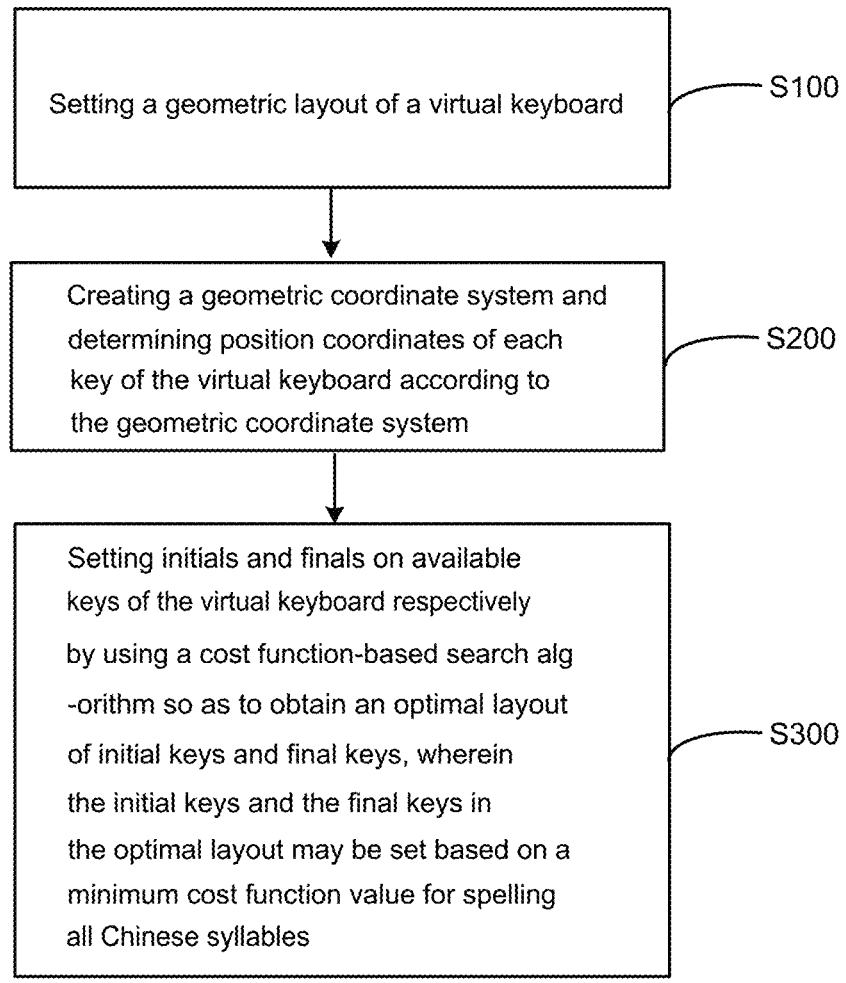
FIG. 3 is a flow chart of a configuring method of a virtual keyboard for inputting Chinese characters according to another embodiment of the present invention.

As shown in FIG. 2, for facilitating the calculation of the cost function, a geometric coordinate system may be created. FIG. 3 shows a flow chart of this preferred embodiment. The configuring method may include the following step before the step S300.

In S200, a geometric coordinate system is created, and according to the geometric coordinate system, position coordinates of each key of the virtual keyboard are determined for calculating the cost function.

Exemplarily, the geometric coordinate system may be a rectangular geometric coordinate system. Any point on the virtual keyboard may be set as the origin of the geometric coordinate system. For example, the center of any key of the virtual keyboard may be set as the origin of the geometric coordinate system. Preferably, the center of the virtual keyboard may be used as the origin of the geometric coordinate system, as shown in FIG. 2. According to the determined geometric coordinate system, the position coordinate of each key are obtained.

Exemplarily, in the embodiment shown in FIG. 2, the hexagonal shape of each key may be simplified: a horizontal distance 2$a$ between center points of any two adjacent keys is defined as 2 on the abscissa axis and a longitudinal distance b between center points of any two adjacent keys may be defined as 2 on the ordinate axis. At this time, the hexagonal shape is not a regularly hexagonal shape. For a standard regularly-hexagonal shape, when the horizontal distance 2$a$ is defined as 2, the longitudinal distance b should be 1.732. The shape of each key has an influence on the minimum cost function, which will be described in detail with reference to FIG. 10 below.

In the embodiment shown in FIG. 3, the step S200 may be between the step S100 and the step S300. But in other embodiments not shown, the step S200 may be performed before the step S100. That is, it is possible to, after the geometric coordinate system is created, set the geometric layout of the virtual keyboard based on the geometric coordinate system, and determine position coordinate of each key on the virtual keyboard.

Figure 4:
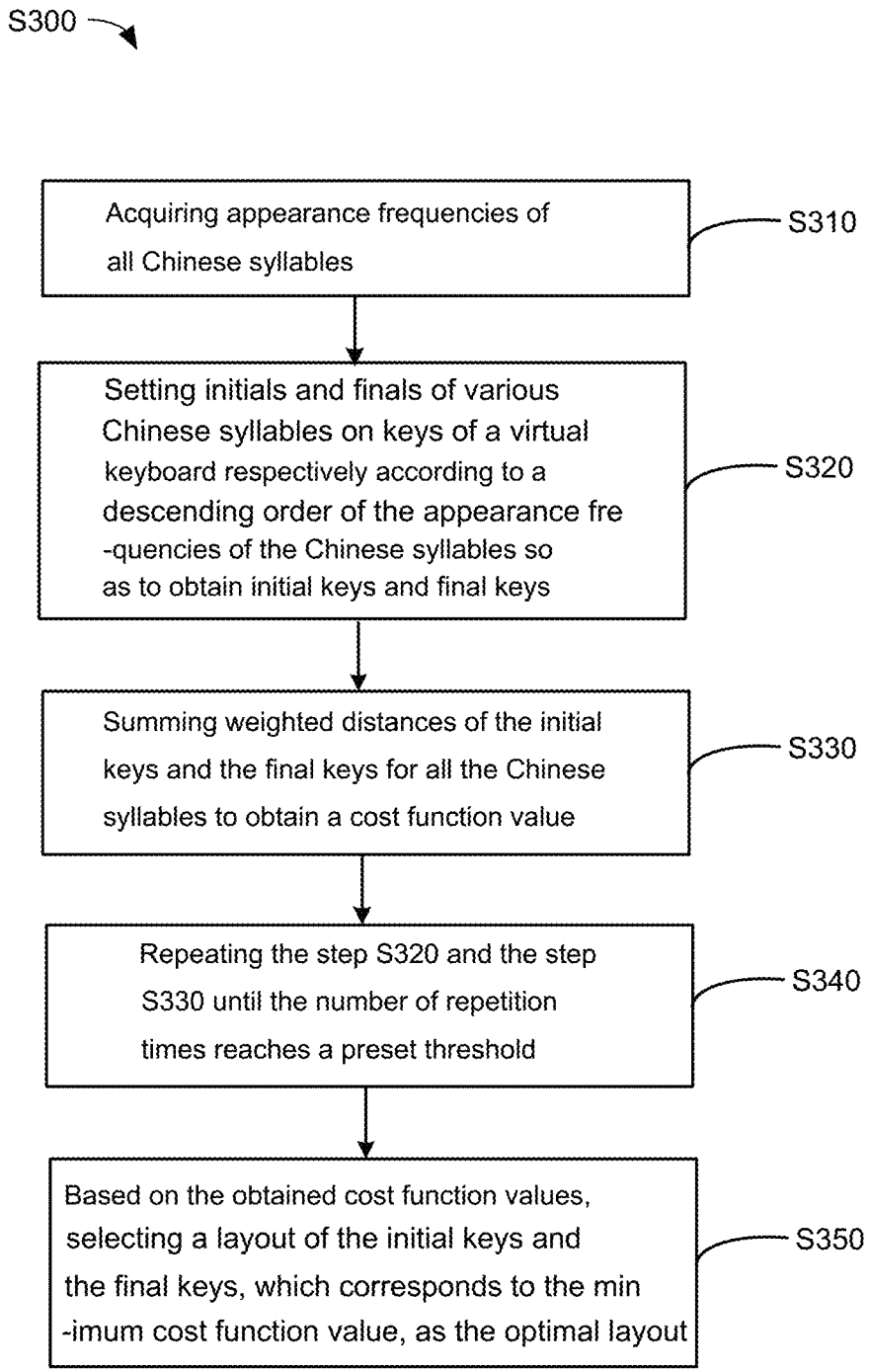
FIG. 4 is a flow chart of step S300 in FIGS. 1 and 3 according to one embodiment of the present invention.

In one preferred embodiment, in step the S300, the minimum cost function value may be obtained based on a greedy algorithm. The greedy algorithm refers to always making the best choice currently when problems are solved so as to obtain a local optimal solution. A local optimal layout is obtained when the initial key and the final key for each Chinese syllable are set, and thus it may be considered that the overall optimal layout is obtained. Based on this, it is expected that the weighted distance between the initial key and the final key for each Chinese syllable is minimum when the initial key and the final key are set, so that the sum of all the weighted distances is expected to be minimum, and further it is expected to obtain the minimum cost function value. In this case, as shown in FIG. 4, the step S300 may include the following steps.

In S310, appearance frequencies of all Chinese syllables are acquired.

Exemplarily, the appearance frequencies of the Chinese syllables may be obtained from an existing Chinese syllable frequency statistical table. In the present application, a preferred acquisition method will be provided, which will be described in detail below.

In step S320, initials and finals of various Chinese syllables are set on keys of the virtual keyboard respectively according to a descending order of the appearance frequencies of the Chinese syllables so as to obtain the initial keys and the final keys. If keys for both an initial and a final of a Chinese syllable are not determined, one of the initial and the final is randomly set on one key. Moreover, when an initial or a final of each Chinese syllable is set, the initial or the final is set on a key with the smallest distance to the key for the other one of the final and the initial, whose key has been determined, of the Chinese syllable.

As mentioned above, there are 416 Chinese syllables in Chinese in total, which are "de", "shi", "yi", "zhi", "ji", "you", "bu", "zhe" and the like sequentially according to the descending order of the appearance frequencies. When the initials and the finals of the various Chinese syllables are set, the initials and the finals of the various Chinese syllables are set one by one according to the appearance frequencies thereof. Specifically, the initial "d" and the final "e" of the Chinese syllable "de" having the highest appearance frequency are set firstly on keys, then followed by the initial "sh" and the final "i" of the Chinese syllable "shi" having the second highest appearance frequency, next followed by the initials and the finals of the Chinese syllables "yi", "zhi", "ji", "you", "bu", "zhe" and the like in sequence; and the initial and the final of the Chinese syllable having the lowest appearance frequency are set on keys finally.

The following four cases may occur when the initials and the finals of the 416 Chinese syllables are set one by one according to the appearance frequencies:

1. the keys for both the initial and the final of the Chinese syllable are not determined;
2. for the Chinese syllable, the key for the final is determined, but the key for the initial is not determined;
3. for the Chinese syllable, the key for the initial is determined, but the key for the final is not determined; and
4. the keys for both the initial and the final of the Chinese syllable are determined.

Specifically, for the Chinese syllable "de" which is set firstly due to the highest appearance frequency thereof, as the keys for both the initial "d" and the final "e" of the Chinese syllable "de" are not determined, this belongs to case 1. One of the initial "d" and the final "e" is randomly set on one available key of the virtual keyboard. Considering minimization of the weighted distance, the other one of the initial "d" and the final "e" may be set on a key with the smallest distance to the key for the one, whose key has been determined. Specifically, the initial "d" may be randomly set on one available key of the virtual keyboard firstly and then the final "e" is set on one available key with the smallest distance to the key for the initial "d". As the key with the smallest distance to the key for the initial "d" is the key where the initial "d" is located, "e" and "d" are set on the same key. Optionally, it is also possible to determine randomly the key for the final "e" firstly and then determine the key for the initial "d". Since the shortest distance between the initial and the final of the Chinese syllable is required when each Chinese syllable is set, "e" and "d" are set on the same key.

When the initial "sh" and the final "i" of the Chinese syllable "shi" are set, as the keys for both the initial "sh" and the final "i" are not determined, this belongs to case 1. The initial "sh" or the final "i" may be randomly set on an available key (i.e., the remaining available keys except "d e" key). After the key for the initial "sh" or the final "i" is determined, according to the principle of the shortest distance between the initial and the final of each Chinese syllable, the final "i" or the initial "sh", whose key is not determined, is set on a key with the smallest distance to the key for the other one of the initial "sh" and the final "i", whose key has been determined. Thus, the weighted distance between the initial "sh" and the final "i" of the Chinese syllable "shi" is minimum. Similar to the case of the Chinese syllable "de", the initial "sh" and the final "i" are also set on the same key.

When the initial "y" and the final "i" of the Chinese syllable "yi" are set, as the key for the final "i" has been determined when the Chinese syllable "shi" is set, this belongs to case 2. According to the principle of the shortest distance between the initial and the final of each Chinese syllable, the initial "y", whose key is not determined, is set on an initial available key (i.e., the remaining available keys except the "d" key and the "sh" key) with the smallest distance to the key for the final "i", which has been determined, so that the weighted distance between the initial "y" and the final "i" of the Chinese syllable "yi" is minimum.

When the Chinese syllables "zhi" and "ji" are set, it is may be determined that these two Chinese syllables belong to case 2. Thus they may be set with reference to the Chinese syllable "yi". When the initial "zh" is set, the initial "zh" is set on an initial available key (i.e., the remaining available keys except the "d" key, the "sh" key and the "y" key) with the smallest distance to the key for the final "i". When the initial "j" is set, the initial "j" is set on an initial available key (i.e., the remaining available keys except the "d" key, the "sh" key, the "y" key and the "zh" key) with the smallest distance to the key for the final "i".

When the Chinese syllable "you" is set, as the key for the initial "y" has been determined when the Chinese syllable "yi" is set and it only needs to determine the key for the final "ou", this belongs to case 3. Among the final available keys, a key with the smallest weighted distance is selected as the key for the final "ou".

When the Chinese syllable "bu" is set, as the keys for both the initial "b" and the final "u" on the virtual keyboard are not determined, this belongs to case 1. One of the initial "b" and the finals "u" is randomly set on an available key, and then a key with the smallest weighted distance is selected as an available key for the other one of the initial "b" and the final "u". The result is that the initial "b" and the final "u" are set on the same key.

When the Chinese syllable "zhe" is set, as the keys for both the initial "zh" and the final "e" are determined when the Chinese syllables "zhi" and "de" are set respectively, there is no need to determine positions for the Chinese syllable "zhe" and this belongs to case 4.

The above steps may continue until all of the initials and the finals of the 416 Chinese syllables are set on the keys on the keyboard.

In S330, weighted distances of the initial keys and the final keys for all the Chinese syllables are summed to obtain a cost function value, wherein the weighted distance is determined according to the distance between the initial key and the final key for the Chinese syllable and the appearance frequency of the Chinese syllable.

Exemplarily, each Chinese syllable is set, a newly added weighted distance may be calculated and this newly added weighted distance and the previously calculated weighted distance are summed. The weighted distance is determined according to the distance between the initial key and the final key for the Chinese syllable and the appearance frequency of the Chinese syllable. For example, the weighted distance of the Chinese syllable "de" is determined according to the distance between the "d" key and the "e" key and the appearance frequency of the Chinese syllable "de". For a Chinese syllable which belongs to case 4, all that is needed is to calculate the weighted distance of the initial key and the final key for the Chinese syllable and to sum this weighted distance and the previously calculated weighed distance. After the initial keys and the final keys for all the Chinese syllables are determined, the sum of the weighted distances is obtained, thereby obtaining the cost function value.

After the keys for all the Chinese syllables are set each time, one cost function value is obtained.

In S340, the step S320 and the step S330 are repeated until the number of repetition times reaches a preset threshold.

The above case 1 exists when the Chinese syllables are set and it needs to randomly select the key on the keyboard. Therefore, n layouts of the initial keys and the final keys exist. N cost function values may be obtained due to the n layouts. Only the local optimal solution may be obtained after searching is performed once (one key layout is obtained) according to the above greedy algorithm. Therefore, it may need to repeat the above step S320 and the above step S330 until the number of repetition times reaches the preset threshold. The preset threshold may be greater than or equal to $10^7$, such as $1\times10^7$, $5\times10^7$, $1\times10^8$, $5\times10^8$, $1\times10^9$, $5\times10^9$ and so on. Optionally, the preset threshold may be large enough to search for as many local optimal key layouts as possible. After the number of repetition times reaches the preset threshold, the minimum cost function value obtained from all key layouts no longer decreases, which may be considered that a globally optimal solution of the algorithm is obtained.

In S350, based on the obtained cost function values, a layout of the initial keys and the final keys, which corresponds to the minimum cost function value, is selected as the optimal layout.

The layout of the initial keys and the final keys, which corresponds to the minimum cost function value, is selected as the optimal layout.

In the step S320 above, during the setting of the initial or the final of each Chinese syllable, if there are a plurality of keys with the smallest distance to the key for the other one of the final and the initial, whose key has been determined, of the Chinese syllable, one key is randomly selected from the plurality of keys for setting the initial or the final of the Chinese syllable. For example, when the keys for the initial "y" and the final "i" of the Chinese syllable "yi" are determined, as the key for the final "i" has been determined when the Chinese syllable "shi" is set, there is a plurality of keys with the smallest distance to the key for the final "i" which has been determined and the plurality of keys is located around the key for the final "i". One key is randomly selected from the plurality of keys as the key for the initial "y".

In one preferred embodiment, the step S320 that the initials and the finals of the various Chinese syllables are respectively set on the keys of the virtual keyboard includes: different initials are set on different keys and different finals are set on different keys, so that the number of an initial and a final which correspond to any one of the keys does not exceed two. When the Chinese character is input, the initial key in the virtual keyboard may be selected firstly to obtain an initial portion of the Chinese character; and then the final key in the virtual keyboard may be selected to obtain a final portion of the Chinese character, thereby spelling the Chinese syllable corresponding to this Chinese character. Subsequently, a user may enter a Chinese character selection page to select a target Chinese character and thus complete the input of the single Chinese character. As the different initials are set on the different keys and the different finals are set on the different keys, at most one initial and one final are set on the same key. When the Chinese syllable corresponding to each target Chinese character is input, it may be preset that: the initial on the key is selected during the first input and the final on the key is selected during the second input; or if a switch key is operated during the first input, then the final on the key is selected during the second input, which will be described in detail below. As such, it is possible to ensure that the Chinese syllable obtained by performing input twice is unique (that is, the syllable has zero repeated code), which can reduce the number of corresponding Chinese characters and reduce the page-turning rate when the Chinese character is selected. Furthermore, it is convenient for setting of a prompt character for the key.

Exemplarily, when the initial keys and the final keys are set, the initials and the finals may be set on two virtual keyboards receptively at first. After all the initial keys and the final keys are determined on the two virtual keyboards receptively, the two virtual keyboards, on which the initial keys and the final keys are determined, may be merged to obtain one final virtual keyboard.

In a further preferred embodiment, the configuring method provided according to the embodiment of the present invention further includes: a prompt character is set for a key, wherein the prompt character is a Chinese character corresponding to a Chinese syllable composed of the initial and the final on this key. There may be a plurality of Chinese characters corresponding to the Chinese syllable composed of the initial and the final on each key. According to the principle for facilitating memorization, a Chinese character having the highest frequency is preferably selected as the prompt character, or a Chinese character, which may be combined with a prompt character on an adjacent key to form a phrase or a short sentence with certain meaning, is preferably selected as the prompt character.

Figure 5:
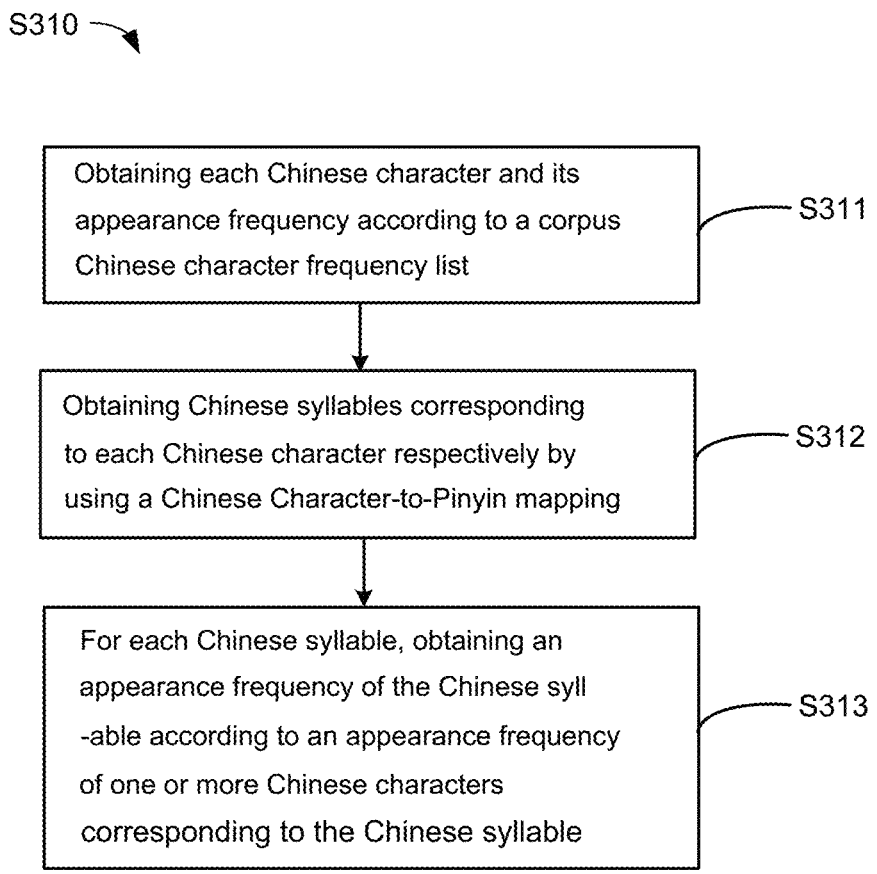
FIG. 5 is a flow chart of step S310 in FIG. 4 according to one embodiment of the present invention.

In one preferred embodiment, as shown in FIG. 5, the above step S310 may specifically include the following steps.

In S311, each Chinese character and its appearance frequency are obtained according to a corpus Chinese character frequency list. Exemplarily, each Chinese character and its appearance frequency may be obtained according to a corpus Chinese character frequency list based on big data. Specifically, *Modern Chinese Corpus Word Frequency Table* based on corpus containing 20 million words may be used.

In S312, Chinese syllables corresponding to each Chinese character respectively are obtained by using a Chinese Character-to-Pinyin mapping. Exemplarily, the Chinese syllables corresponding to each Chinese character respectively may be obtained by using a Chinese Character-to-Pinyin mapping table. Different Chinese characters may correspond to the same Chinese syllable. For example, all of Chinese characters "的", "得", "德" and the like correspond to the Chinese syllable "de".

In S313, for each Chinese syllable, an appearance frequency of the Chinese syllable is obtained according to an appearance frequency(ies) of one or more Chinese characters corresponding to the Chinese syllable. Chinese syllables corresponding to all the Chinese characters are statistically analyzed. In most cases, one Chinese syllable corresponds to a plurality of Chinese characters. In such a case, the appearance frequency of the Chinese syllable is determined according to the appearance frequencies of the plurality of Chinese characters corresponding to this Chinese syllable. For example, the appearance frequency of the Chinese syllable may be obtained by summing the appearance frequencies of the plurality of Chinese characters corresponding to the same Chinese syllable. For a very few Chinese syllables that correspond to only one Chinese character, such as "fiao", the appearance frequency of the Chinese character "㲹" corresponding thereto is the appearance frequency of this Chinese syllable.

Figure 6:
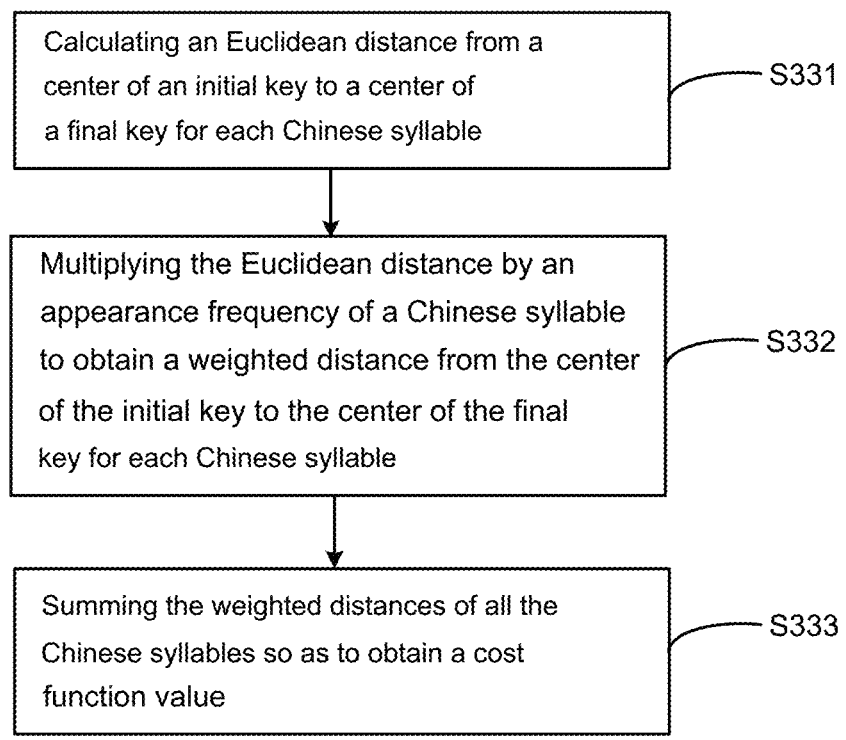
FIG. 6 is a flow chart for calculating the cost function value in step S330 in FIG. 4 according to one embodiment of the present invention.

In one preferred embodiment, as shown in FIG. 6, the cost function value in the above step S310 may be calculated according to the following steps.

In S331, a Euclidean distance from a center of an initial key to a center of a final key for each Chinese syllable is calculated. The Euclidean distance refers to a true distance between two points in space. After the geometric layout of the virtual keyboard is determined, the Euclidean distance between centers of any two keys may be obtained. In embodiments in which the geometric coordinate system is created, the Euclidean distance from the center of the initial key to the center of the final key may be calculated according to coordinates of the keys in the geometric coordinate system.

In S332, the Euclidean distance is multiplied by an appearance frequency of a Chinese syllable to obtain a weighted distance from the center of the initial key to the center of the final key for each Chinese syllable.

In S333, the weighted distances of all the Chinese syllables are summed so as to obtain the cost function value.

Figure 7:
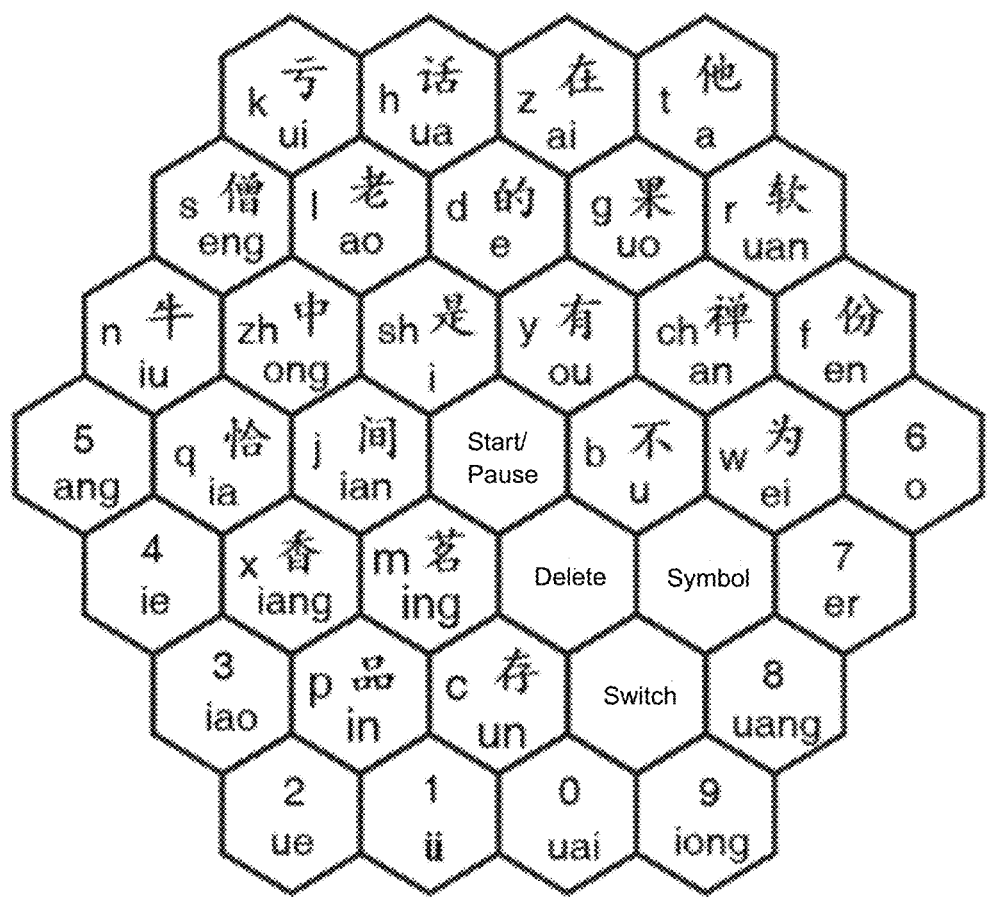
FIG. 7 is a diagram of a virtual keyboard according to one embodiment of the present invention.

FIG. 7 is a diagram showing a preferred virtual keyboard obtained according to the configuring method of an embodiment of the present invention. As shown in FIG. 7, in addition to initial keys and final keys on the virtual keyboard, keys on the virtual keyboard include function keys required for inputting the Chinese characters, such as a start/pause key, a delete key, a symbol key and/or a switch key, and numerical keys. These function keys may be set before setting of the initial keys and the final keys. Therefore, the configuring method according to the embodiment of the present invention further includes one or more of the following steps before the step S300.

The start/pause key may be set at a position in the center of the virtual keyboard. The start/pause key is configured to control a start and an end of Chinese character input. In one preferred embodiment, the start and the end of Chinese character input may be controlled by spreading the virtual keyboard and hiding the spread virtual keyboard to such a state that only the start/pause key is displayed. When the keyboard is not used, only the start/pause key is displayed on a display interface. When a user wants to input a Chinese character, he may select the start/pause key, so that the virtual keyboard is spread and the whole keyboard presents on the display interface. When the user wants to stop the input, he may select the start/pause key again, so that the virtual keyboard is hidden so that only the start/pause key is displayed on the display interface. As the start/pause key is used when the Chinese character is input every time, the start/pause key may be set in the center of the virtual keyboard. In the embodiment in which the geometric layout of the virtual keyboard is regularly hexagonal or circular, the keys may be annularly set with taking the start/pause key as the center.

The delete key may be set at a position closely adjacent to the center of the virtual keyboard and on the lower right of the center. The delete key is configured to delete a Chinese character that has been input or an initial or a final that has been input.

A symbol key, a switch key and/or an option key are set at a position(s) spaced apart from the center of the virtual keyboard and on the lower right of the center.

The symbol key is configured to input Chinese symbols which may include punctuation, operational symbols, emoticons, and/or other symbols. The punctuation may include one or more of a question mark "?", a comma ",", a full stop "。", an exclamation mark "!", a slight-pause mark "、", a colon ":", a semicolon ";", an ellipsis " . . . ", a left parenthesis "(", a right parenthesis ")", a tilde "~", a left angle quote "《" and a right angle quote "》". The operational symbols may include one or more of "+", "−", "×", "÷", and "=". The emoticons may include one or more of ": D", ":)", ": P" and ": (". The other symbols may include one or more of "*", "/", "&", "\", "#" and the like.

The switch key is configured to switch input modes of the Chinese syllables, for example, switch between a two-syllable (composed of an initial and a final) input mode and a one-syllable (composed of a final only) input mode. By default, the virtual keyboard is in the two-syllable input mode. When it needs to switch to the one-syllable input mode, the switch key is selected and thus the virtual keyboard may enter the one-syllable input mode.

The option key is configured to select options that are used for responding to user's daily needs, such as one-key calling, one-key drinking, one-key dialing and so on.

The numerical keys are set at positions farthest from the center of the virtual keyboard and at a lower portion of the virtual keyboard. The numerical keys are configured to input ten numbers from "0" to "9", which are respectively set on ten keys. The numerical keys have a lower use frequency in daily life and thus are set at the positions farthest from the center of the virtual keyboard and at the lower portion of the virtual keyboard. In the keyboard having the geometric layout shown in FIG. 7, the numerical keys are set on the outermost ring and at the lower portion.

The initials in the Chinese syllables include (according to a descending order of appearance frequencies) 23 initials in total, i.e., "d", "y", "sh", "b", "l", "z", "r", "zh", "h", "w", "g", "t", "m", "j", "ch", "x", "f", "n", "k", "s", "q", "c", and "p". The finals in the Chinese syllables include (according to a descending order of appearance frequencies) 33 finals in total, i.e., "e", "i", "u", "ai", "ou", "en", "ang", "a", "o" "ong", "ei" "eng", "ao", "uo", "iu", "ui", "ue", "ia", "er", "ian", "ing", "an", "iao", "in", "ua", "ie", "iang", "uan", "un", "uang", "ü", "uai", and "iong". There are 10 more finals than initials, and thus 10 numbers may be just set on 10 keys with only finals.

It should be noted that there is no specific sequence for steps for setting the function keys and the numerical keys.

According to the number of keys that need to be set and the principle of the shortest movement distance when the Chinese characters are input, the preferred embodiment of the present invention provides a virtual keyboard having the following geometric layout. The virtual keyboard includes seven rows of keys in total, which include 4 keys, 5 keys, 6 keys, 7 keys, 6 keys, 5 keys, and 4 keys from top to bottom, respectively. Although each key shown in FIG. 7 is regularly hexagonal, optionally each key may be circular, square, regularly pentagonal, or take the shape of a polygon with more than 6 sides, or the like. The virtual keyboard includes 37 keys in total, 33 keys of which are used for setting the numbers, the initials, and the finals. Optionally, the remaining 4 keys may be the start/pause, the delete key, the symbol key and the switch key respectively. Optionally, in the case that the option key needs to be set, the switch key and the option key may be combined to one key for which a secondary keyboard may be set. The switch key and various option keys for responding to user's daily needs are all located on the secondary keyboard.

In this embodiment, the keys of the virtual keyboard are the key "亏 k ui", the key "话 h ua", the key "在 z ai", the key "他 t a", the key "僧 s eng", the key "老 l ao", the key "的 d e", the key "果 g uo", the key "软 r uan", the key "牛 n iu", the key "中 zh ong", the key "是 sh i", the key "有 y ou", the key "禅 ch an", the key "份 f en", the key "5 ang", the key "恰 q ia", the key "间 j ian", the key "Start/Pause", the key "不 b u", the key "为 w ei", the key "6 o", the key "4 ie", the key "香 x iang", the key "茗 m ing", the key "Delete", the key "Symbol", the key "7 er", the key "3 iao", the key "品 p in", the key "存 c un", the key "Switch", the key "8 uang", the key "2 ue", the key "1 ü", the key "0 uai", and the key "9 iong" from top to bottom and from left to right.

For facilitating description, the spatial relative terms such as "upper", "above", "lower", "below", "left", "right" used herein serve to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component or the feature in the accompanying drawings is turned upside down, the upper and lower positional relationships can be interchanged. Again for example, the position relationship described by the above spatial relative terms may be changed if the component or the feature in the accompanying drawings is rotated by 90 degrees or any other angle. The present invention is intended to encompass all these cases.

That is, the keyboard according to the above preferred embodiment may be rotated by any angle or vertically reversed (namely, the positions of the first row and the seven row, the positions of the second row and the sixth row as well as the positions of the third row and the fifth row may be exchanged respectively) or may also be horizontally reversed.

In one preferred embodiment, the virtual keyboard may include a first secondary keyboard, a second secondary keyboard and/or a third secondary keyboard. The symbol key is configured to activate the first secondary keyboard. The option key is configured to activate the second secondary keyboard. The third secondary keyboard is activated after input of each Chinese syllable. In this case, the configuring method provided according to embodiments of the present invention accordingly further includes the followings steps.

Figure 8:
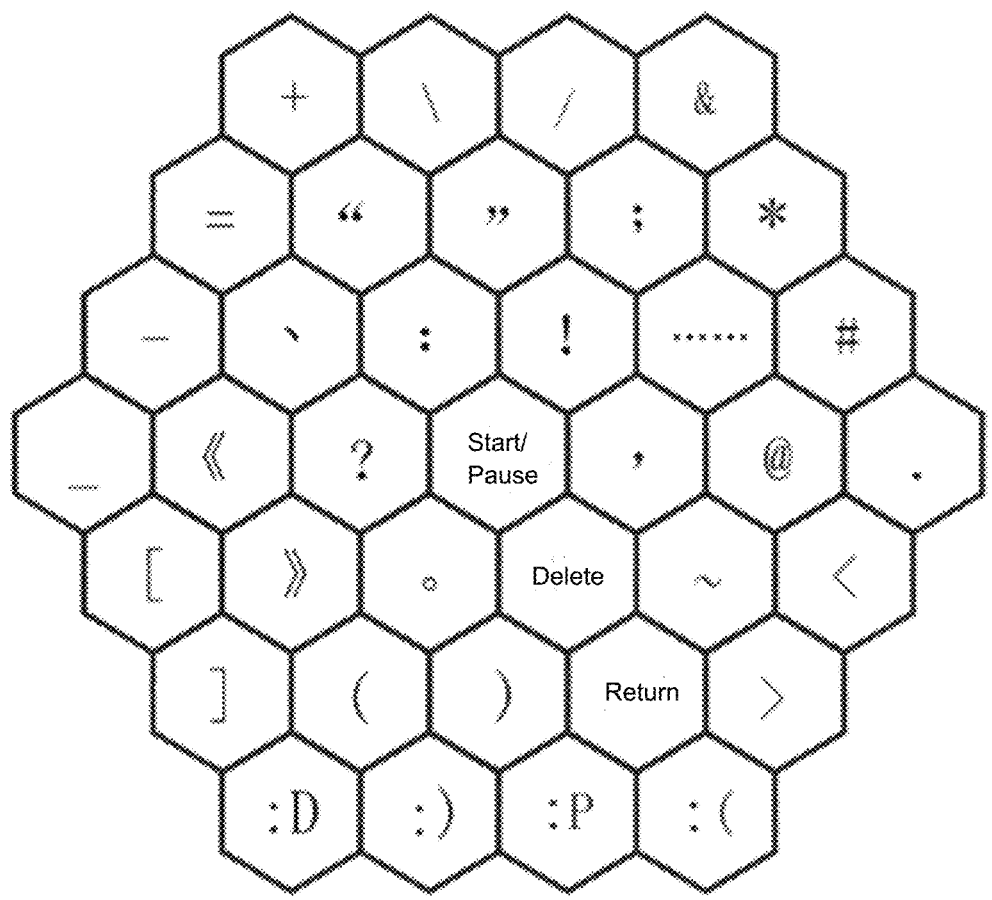
FIG. 8 is a diagram of a secondary keyboard for symbol keys according to one embodiment of the present invention.

One or more of the various Chinese symbols above mentioned are set on the first secondary keyboard, as shown in FIG. 8. In addition, a start/pause key may be set at the center of the first secondary keyboard, and a delete key and a return key may be set on the lower right of the center on the first secondary keyboard. Optionally, the delete key and the return key may be set on the same positions on the first secondary keyboard as the delete key and the switch key on the main interface of the virtual keyboard respectively.

Keys for responding to user's daily needs, such as one-key calling, one-key drinking, and one-key dialing, are set on the second secondary keyboard.

Figure 9:
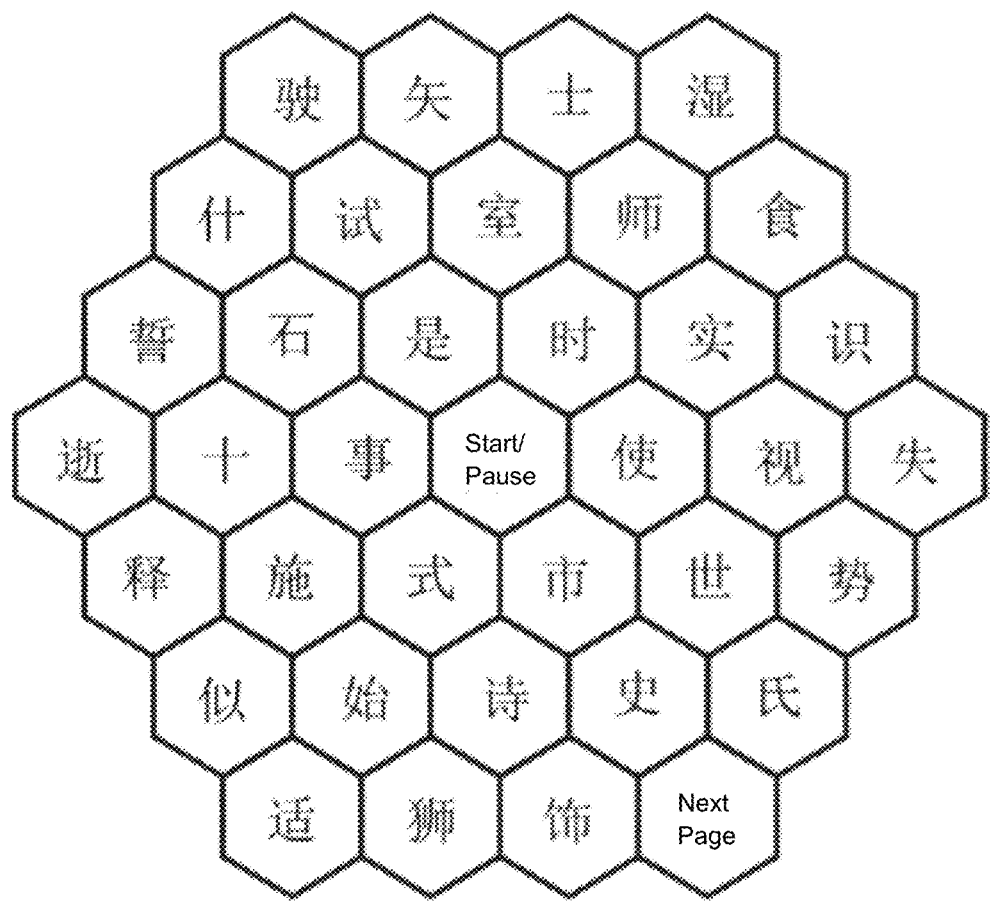
FIG. 9 is a diagram of a secondary keyboard for selecting a Chinese character after a Chinese syllable "shi" is input with a virtual keyboard according to one embodiment of the present invention.

A Chinese character(s) corresponding to a Chinese syllable is set on the third secondary keyboard. A start/pause key is set at the center of the third secondary keyboard. A page-turning key located is set at the lower right corner on the third secondary keyboard. As shown in FIG. 9, the page-turning key is configured to present a new page of optional Chinese characters on the third secondary keyboard.

The user may perform the following operation steps when inputting Chinese characters every time.

In step S1000, the single "start/pause" key on the display interface is selected, so that the virtual keyboard is spread. For example, the whole keyboard as shown in FIG. 7 is displayed on the display interface so as to start working.

In step S1002, for a disyllabic Chinese character whose Chinese syllable is composed of an initial and a final, the initial of the disyllabic Chinese character is input firstly and the final thereof is input secondarily; and for a monosyllabic Chinese character whose Chinese syllable is composed of a final only, the switch key is selected firstly and then the final corresponding to the monosyllabic Chinese character is input. For the first input (excluding the first input after selection of the switch key) of each Chinese character, the initial on the key is selected by default. The first input after selection of the switch key is regarded as selecting the final corresponding to this key.

For example, when the Chinese characters "你好" are input, it needs to firstly select the initial "n" on the key where the prompt character "牛" is located and then select the final "i" on the key where the prompt character "是" is located. Next, the Chinese characters "好" is input, it needs to firstly select the initial "h" on the key where the prompt character "话" is located and then select the final "ao" on the key where the prompt character "老" is located.

For example, when the Chinese characters "偶尔" are input, each of the Chinese characters "偶" and "尔" is a monosyllabic Chinese character whose Chinese syllable composed of a final only. For the Chinese character "偶", it needs to select the switch key firstly and then select the final "ou" on the key where the prompt character "有" is located; and for the Chinese character "尔", it needs to select the switch key firstly and then select the final "er" on the key "7 er".

In step S1003, after each Chinese syllable is input, the virtual keyboard may enter the secondary keyboard for selecting the Chinese character, as shown in FIG. 9. A target Chinese character is selected on this secondary keyboard. Specifically, if it needs to input the Chinese character "是", a Chinese character selection interface of the Chinese syllable "shi" is displayed on the secondary keyboard as shown in FIG. 9 after the initial and the final are selected so as to select the target Chinese character. The Chinese character that has been input may be displayed in a specific display frame. Exemplarily, the display frame may be a rectangular frame (not shown) above the virtual keyboard, in which displays all input Chinese characters.

In step S1004, if the user wants to pause the input, he may select the start/pause key and thus the keyboard is hidden with the start/pause key displayed only. The user may stop input at any time so as to ensure that he can have a rest at any time when feeling fatigued.

Figure 10:
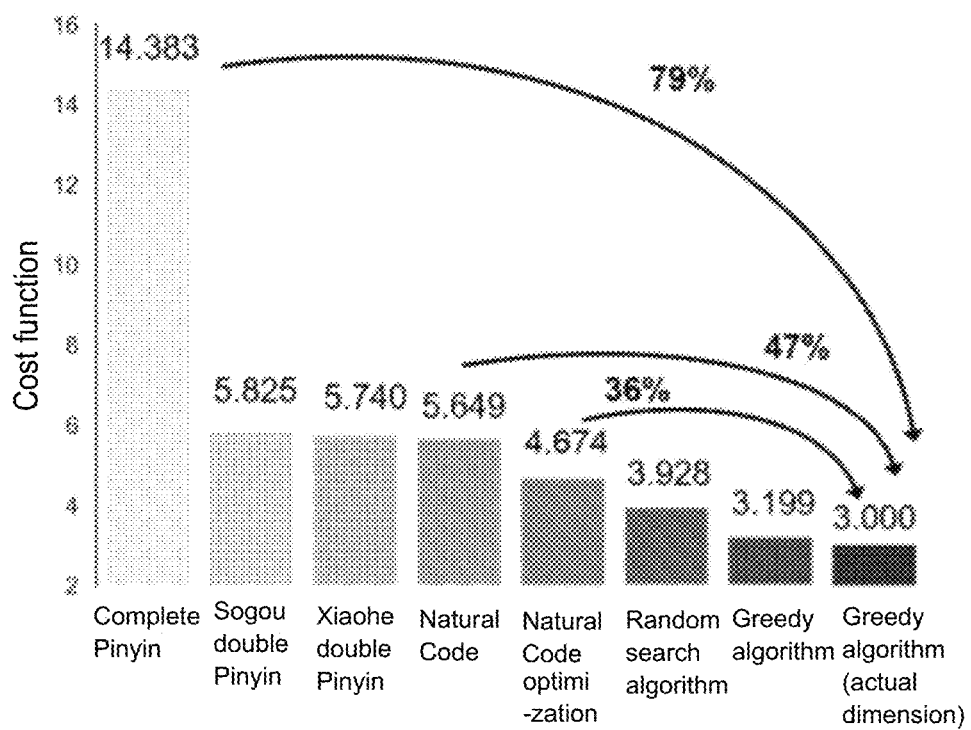
FIG. 10 is a diagram illustrating the performance of a virtual keyboard according to one embodiment of the present invention compared with that of other virtual keyboards.

FIG. 10 is a diagram for comparing the performance of the virtual keyboard according to an embodiment of the present invention with that of other virtual keyboards. It can be seen from FIG. 10 that the minimum cost function value which is obtained by the virtual keyboard for inputting all Chinese syllables and configured by the greedy algorithm is significantly less than those obtained by other virtual keyboards. For the movement distance when the Chinese characters are input, the minimum cost function value of the virtual keyboard which is based on the standard regularly-hexagonal keys and obtained by the greedy algorithm (Greedy algorithm (actual dimension)) is decreased by approximately 80% compared with that of an existing QWERT complete Pinyin virtual keyboard, and is decreased by approximately 50% compared with that of a commercially-available double Pinyin virtual keyboard (i.e., natural code). The virtual keyboard based on the simplified hexagonal keys and obtained by the greedy algorithm is also significantly superior to other existing virtual keyboards.

By adopting the virtual keyboard configured according to embodiments of the present invention, a Chinese character input scheme having the shortest movement distance and a few number of spelling times can be provided for the Chinese character input system based on the brain-computer interface device or the eye-tracking device. This scheme optimizes the layout of keys by combining Chinese language characteristics, and thus can greatly improve efficiency and usability of the Chinese characters input.

According to another aspect of the present invention, a Chinese character input system is also provided. The Chinese character input system includes any virtual keyboard as mentioned above. Exemplarily, the Chinese character input system may acquire an input signal based on a brain-computer interface device or an eye-tracking device.

According to a further aspect of the present invention, a method for inputting Chinese characters on a computing device is provided. In the method, the virtual keyboard configured by any configuring method as mentioned above is employed to input the Chinese characters.

Although exemplary embodiments have already described with reference to the accompanying drawings here, it should be understood that the above embodiments are merely exemplary and are not intended to limit the scope of the present invention to this. Persons of ordinary skill in the art can make various changes and modifications without departing from the spirit and scope of the present invention. All these changes and modifications are intended to be included within the scope of the present invention defined by the appended claims.

It may be appreciated by persons of ordinary skill in the art that, units of various examples described in conjunction with the embodiments disclosed herein may be implemented as electronic hardware, or a combination of computer software and electronic hardware. Whether these functions are implemented as hardware or software depends on particular applications and design constraints of the technical solutions. A person skilled in the art may implement the described functions with different methods for each of particular applications, but such implementation shall not be regarded as going beyond the scope of the present invention.

In several embodiments provided by the present application, it should be understood that the disclosed devices and methods may be implemented by other means. For example, the device embodiments described above are merely schematic. For example, the partitioning of the units may be a logical functional partitioning. There may be other partitioning modes during actual implementation. For example, multiple units or components may be combined or integrated into another device, or some features may be ignored or not executed.

Numerous specific details are set forth in the description provided herein. However, it can be understood that the embodiments of the present invention may be practiced without these specific details. In some examples, well-known methods, structures and techniques have not been shown in detail in order not to obscure an understanding of this description.

Similarly, it should be understood that various features of the present invention are sometimes grouped together in a single embodiment, figure, or description thereof for the purpose of streamlining the present invention and aiding in the understanding of one or more of the various inventive aspects. The method of the present invention, however, should not to be interpreted as reflecting an intention that the claimed present invention requires more features than those expressly defined in each claim. Rather, as the corresponding claims reflect, inventive aspects lie in that the corresponding technical problems are solved with less than all features of a certain single disclosed embodiment. Thus, the claims following the detailed description are hereby expressly incorporated into this detailed description, with each claim standing on its own as a separate embodiment of the present invention.

It will be understood by those skilled in the art that all of the features disclosed in this description (including the appended claims, abstract and accompanying drawings) and all of the processes or units of any method or device disclosed in such a way may be combined in any combination, except combinations where features are mutually exclusive. Each feature disclosed in this description (including the appended claims, abstract and accompanying drawings) may be replaced by alternative features serving the same, equivalent or similar purpose, unless expressly stated otherwise.

In addition, it may be understood by those skilled in the art that while some embodiments described herein include some but not other features included in other embodiments, combinations of features of different embodiments are meant to be within the scope of the present invention, and form different embodiments. For example, in the claims, any of the claimed embodiments can be used in any combination.

It should be noted that the above embodiments are provided for illustration of the present invention and are not intended to limit the present invention and those skilled in the art may design alternative embodiments without departing from the scope defined by the appended claims. In the claims, any reference sign between brackets should not be construed as limiting the claims. The word "comprising" does not exclude the presence of other elements or steps which are not listed in the claims. The word "one" or "a" preceding an element does not exclude the presence of a plurality of such elements. The present invention may be implemented by means of hardware including several different elements and by means of an appropriately programmed computer. In unit claims listing several means, several of these means may be embodied by one and the same item of hardware. Use of the words first, second, third and the like does not indicate any ordering, and these words may be interpreted as names.

The above description is merely a specific implementation mode of the present invention or is illustrative of the specific implementation mode of the present invention, but the scope of protection of the present invention is not limited to this. Any changes or replacements that would be readily conceived by any person skilled in the art within the technical scope disclosed in the present invention should be within the scope of protection of the present invention. The scope of protection of the present invention shall be subject to the scope of protection defined by the claims.

The invention claimed is:

1. A method of operating a computing device to perform a configuring method of a virtual keyboard for inputting Chinese characters, the configuring method comprising the following steps:
(S100) setting a geometric layout of the virtual keyboard; and
(S300) setting initials and finals on available keys of the virtual keyboard respectively by using a cost function-based search algorithm so as to obtain an optimal layout of initial keys and final keys, wherein the initial keys and the final keys in the optimal layout are set based on a minimum cost function value for spelling all Chinese syllables, and the minimum cost function value is a minimum sum of weighted distances of the initial keys and the final keys for all the Chinese syllables;
wherein the step (S300) comprises the following steps:
(S310) acquiring appearance frequencies of all the Chinese syllables;
(S320) setting initials and finals of various Chinese syllables on keys of the virtual keyboard respectively according to a descending order of the appearance frequencies of the Chinese syllables so as to obtain the initial keys and the final keys, wherein if keys for both an initial and a final of a Chinese syllable are not determined, one of the initial and the final is randomly set on one key, and wherein when an initial or a final of each Chinese syllable is set, the initial or the final is set on a key with the smallest distance to the key for the other one of the final and the initial, whose key has been determined, of the Chinese syllable;
(S330) summing weighted distances of the initial keys and the final keys for all the Chinese syllables to obtain a cost function value, wherein the weighted distance is determined according to a distance between the initial key and the final key for the Chinese syllable and the appearance frequency of the Chinese syllable;
(S340) repeating the step (S320) and the step (S330) until the number of repetition times reaches a preset threshold; and
(S350) based on the obtained cost function values, selecting a layout of the initial keys and the final keys, which corresponds to the minimum cost function value, as the optimal layout;
wherein in the step (S330), the cost function value is calculated according to the following steps:
(S331) calculating a Euclidean distance from a center of an initial key to a center of a final key for each Chinese syllable;
(S332) multiplying the Euclidean distance by an appearance frequency of a Chinese syllable to obtain a weighted distance from the center of the initial key to the center of the final key for each Chinese syllable; and
(S333) summing the weighted distances of all the Chinese syllables so as to obtain the cost function value.

2. The configuring method according to claim 1, wherein in the step (S320), when the initial or the final of each Chinese syllable is set, if there are a plurality of keys with the smallest distance to the key for the other one of the final and the initial, whose key has been determined, of the Chinese syllable, one key is randomly selected from the plurality of keys for setting the initial or the final of the Chinese syllable.

3. The configuring method according to claim 1, wherein in the step (S320), setting the initials and the finals of the various Chinese syllables on the keys of the virtual keyboard comprises:
setting different initials on different keys and setting different finals on different keys, so that the number of an initial and a final corresponding to any one of the keys does not exceed two.

4. The configuring method according to claim 3, further comprising:
setting a prompt character for a key, wherein the prompt character is a Chinese character corresponding to a Chinese syllable composed of the initial and the final on the key.

5. The configuring method according to claim 1, wherein the step (S310) comprises:
(S311) obtaining each Chinese character and its appearance frequency according to a corpus Chinese character frequency list;
(S312) obtaining Chinese syllables corresponding to each Chinese character respectively by using a Chinese Character-to-Pinyin mapping; and
(S313) for each Chinese syllable, obtaining an appearance frequency of the Chinese syllable according to one or more appearance frequencies of one or more Chinese characters corresponding to the Chinese syllable.

6. The configuring method according to claim 1, further comprising:
(S200) creating a geometric coordinate system, and determining position coordinates of each key of the virtual keyboard according to the geometric coordinate system for calculating the cost function.

7. The configuring method according to claim 1, wherein the step (S100) comprises:
setting the virtual keyboard to be regularly hexagonal or circular and uniformly disposing the keys on the virtual keyboard.

8. The configuring method according to claim 7, further comprising one or more of the following steps before the step (S300):
setting a start/pause key at a position in the center of the virtual keyboard;
setting a delete key at a position closely adjacent to the center of the virtual keyboard and on the lower right of the center;
setting at least one of a symbol key, a switch key and an option key at one or more positions spaced apart from the center of the virtual keyboard and on the lower right of the center; and
setting numerical keys at positions farthest from the center of the virtual keyboard and at a lower portion of the virtual keyboard.

9. The configuring method according to claim 8, wherein the switch key is configured to switch to a mode that only a final is input for spelling a Chinese character.

10. The configuring method according to claim 8, wherein the virtual keyboard comprises at least one of a first secondary keyboard, a second secondary keyboard and a third secondary keyboard; the symbol key is configured to activate the first secondary keyboard; the option key is configured to activate the second secondary keyboard; and the third secondary keyboard is activated after input of each Chinese syllable;

the configuring method accordingly further comprises:
setting Chinese symbol keys, a start/pause key at the center, and a delete key and a return key which are located on the lower right of the start/pause key, on the first secondary keyboard;
setting keys responding to user's daily needs on the second secondary keyboard;
or/and
setting one or more Chinese characters corresponding to the Chinese syllable, a start/pause key at the center, and a page-turning key located at the lower right corner, on the third secondary keyboard.

11. The configuring method according to claim 1, further comprising:
setting a start/pause key at a position on the virtual keyboard, wherein the start/pause key is configured to control a start and an end of Chinese character input respectively by spreading the virtual keyboard and hiding the spread virtual keyboard to such a state that only the start/pause key is displayed.

12. A virtual keyboard for inputting Chinese characters, the virtual keyboard comprises:
a layout of the virtual keyboard set by:
(S100) setting a geometric layout of the virtual keyboard; and
(S300) setting initials and finals on available keys of the virtual keyboard respectively by using a cost function-based search algorithm so as to obtain an optimal layout of initial keys and final keys, wherein the initial keys and the final keys in the optimal layout are set based on a minimum cost function value for spelling all Chinese syllables, and
the minimum cost function value is a minimum sum of weighted distances of the initial keys and the final keys for all the Chinese syllables;
wherein the step (S300) comprises the following steps:
(S310) acquiring appearance frequencies of all the Chinese syllables;
(S320) setting initials and finals of various Chinese syllables on keys of the virtual keyboard respectively according to a descending order of the appearance frequencies of the Chinese syllables so as to obtain the initial keys and the final keys,
wherein when an initial or a final of each Chinese syllable is set, the initial or the final is set on a key with the smallest distance to the key for the other one of the final and the initial, whose key has been determined, of the Chinese syllable;
(S330) summing weighted distances of the initial keys and the final keys for all the Chinese syllables to obtain a cost function value, wherein the weighted distance is determined according to a distance between the initial key and the final key for the Chinese syllable and the appearance frequency of the Chinese syllable;
(S340) repeating the step (S320) and the step (S330) until the number of repetition times reaches a preset threshold; and
(S350) based on the obtained cost function values, selecting a layout of the initial keys and the final keys, which corresponds to the minimum cost function value, as the optimal layout;
wherein in the step (S330), the cost function value is calculated according to the following steps:
(S331) calculating a Euclidean distance from a center of an initial key to a center of a final key for each Chinese syllable;
(S332) multiplying the Euclidean distance by an appearance frequency of a Chinese syllable to obtain a weighted distance from the center of the initial key to the center of the final key for each Chinese syllable; and
(S333) summing the weighted distances of all the Chinese syllables so as to obtain the cost function value.

13. The virtual keyboard according to claim 12, comprising seven rows of keys, which comprise 4 keys, 5 keys, 6 keys, 7 keys, 6 keys, 5 keys, and 4 keys from top to bottom, respectively.

14. The virtual keyboard according to claim 12, wherein the keys are "k ui", "h ua", "z ai", "t a", "s eng", "1 ao", "d e", "g uo", "r uan", "n iu", "zh ong", "sh i", "y ou", "ch an", "f en", "5 ang", "q ia", "j ian", "start/pause", "b u", "w ei", "6 o", "4 ie", "x iang", "m ing", "delete", "symbol", "7 er", "3 iao", "p in", "c un", "switch", "8 uang", "2 ue", "1 ü", "0 uai", and "9 iong" in sequence from top to bottom and from left to right.

15. The virtual keyboard according to claim 12, wherein the step (S310) comprises:
obtaining each Chinese character and its appearance frequency;
obtaining Chinese syllables corresponding to each Chinese character respectively; and
for each Chinese syllable, obtaining an appearance frequency of the Chinese syllable according to one or more appearance frequencies of one or more Chinese characters corresponding to the Chinese syllable.

16. The virtual keyboard according to claim 12, wherein setting the layout further comprises:
(S200) creating a geometric coordinate system, and determining position coordinates of each key of the virtual keyboard according to the geometric coordinate system for calculating the cost function.

17. A Chinese character input system, the system comprising:
a display interface displaying a virtual keyboard having a layout set by:
(S100) setting a geometric layout of the virtual keyboard; and
(S300) setting initials and finals on available keys of the virtual keyboard respectively by using a cost function-based search algorithm so as to obtain an optimal layout of initial keys and final keys, wherein the initial keys and the final keys in the optimal layout are set based on a minimum cost function value for spelling all Chinese syllables, and the minimum cost function value is a minimum sum of weighted distances of the initial keys and the final keys for all the Chinese syllables;
wherein the step (S300) comprises the following steps:
(S310) acquiring appearance frequencies of all the Chinese syllables;
(S320) setting initials and finals of various Chinese syllables on keys of the virtual keyboard respectively according to a descending order of the appearance frequencies of the Chinese syllables so as to obtain the initial keys and the final keys, wherein when an initial or a final of each Chinese syllable is set, the initial or the final is set on a key with the smallest distance to the key for the other one of the final and the initial, whose key has been determined, of the Chinese syllable;

(S330) summing weighted distances of the initial keys and the final keys for all the Chinese syllables to obtain a cost function value, wherein the weighted distance is determined according to a distance between the initial key and the final key for the Chinese syllable and the appearance frequency of the Chinese syllable;

(S340) repeating the step (S320) and the step (S330) until the number of repetition times reaches a preset threshold; and (S350) based on the obtained cost function values, selecting a layout of the initial keys and the final keys, which corresponds to the minimum cost function value, as the optimal layout;

wherein in the step (S330), the cost function value is calculated according to the following steps:

(S331) calculating a Euclidean distance from a center of an initial key to a center of a final key for each Chinese syllable;

(S332) multiplying the Euclidean distance by an appearance frequency of a Chinese syllable to obtain a weighted distance from the center of the initial key to the center of the final key for each Chinese syllable; and (S333) summing the weighted distances of all the Chinese syllables so as to obtain the cost function value.

18. The Chinese character input system according to claim 17, wherein the Chinese character input system acquires an input signal based on a brain-computer interface device or an eye-tracking device.

19. The Chinese character input system according to claim 17, wherein the virtual keyboard is configured with seven rows of keys, which have 4 keys, 5 keys, 6 keys, 7 keys, 6 keys, 5 keys, and 4 keys from top to bottom, respectively.

20. The Chinese character input system according to claim 17, wherein (S100) comprises:

setting the virtual keyboard to be regularly hexagonal or circular and uniformly disposing the keys on the virtual keyboard.

\* \* \* \* \*